G. BOELMAN.
FRUIT CATCHER.
APPLICATION FILED APR. 4, 1921.
1,415,863.
Patented May 16, 1922.
2 SHEETS—SHEET 1.
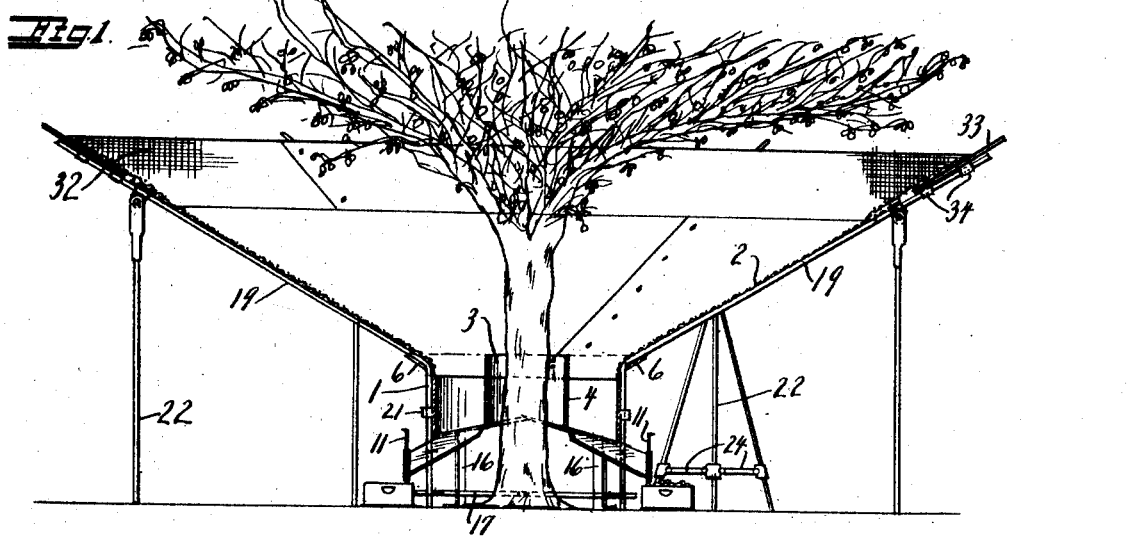
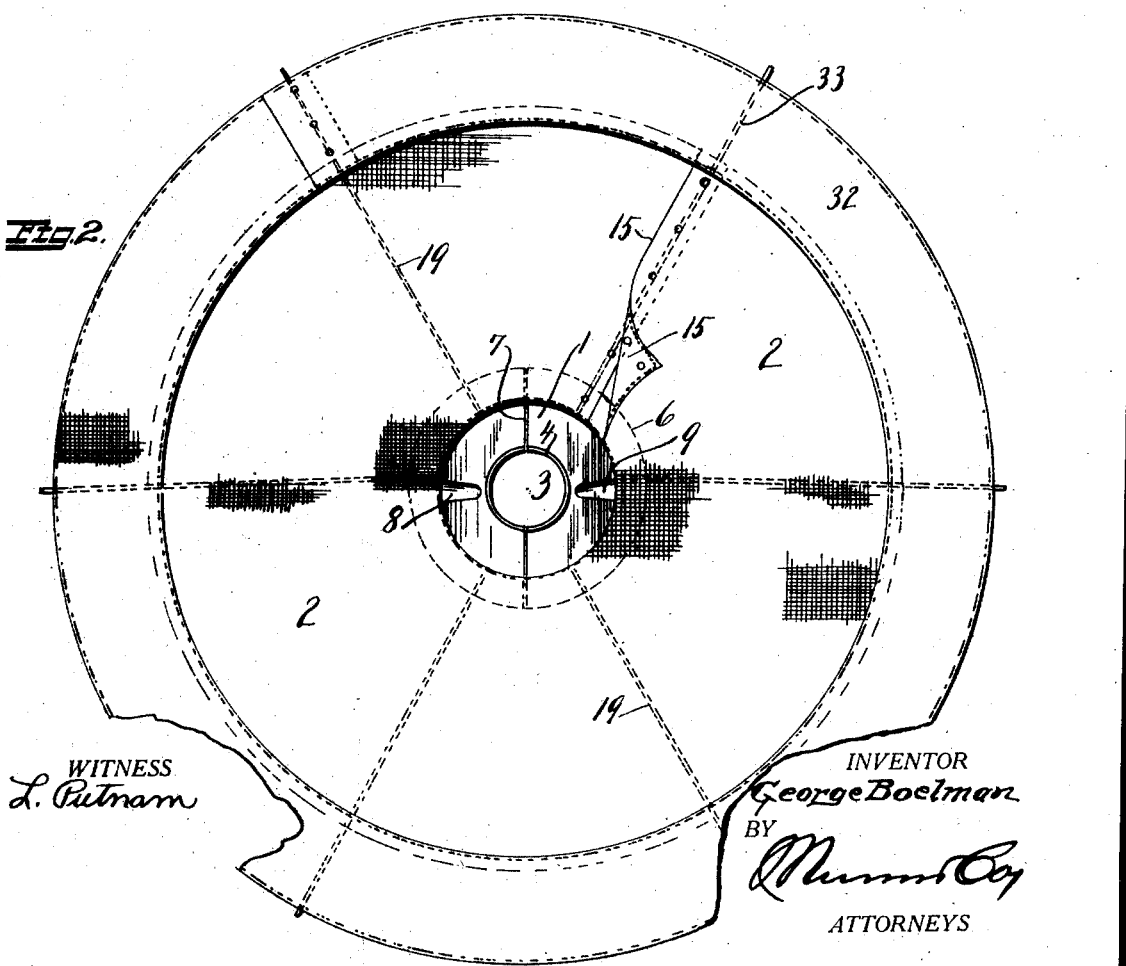
WITNESS
L. Putnam
INVENTOR
George Boelman
BY
Munn & Co.
ATTORNEYS G. BOELMAN.
FRUIT CATCHER.
APPLICATION FILED APR. 4, 1921.
1,415,863.
Patented May 16, 1922.
2 SHEETS—SHEET 2.
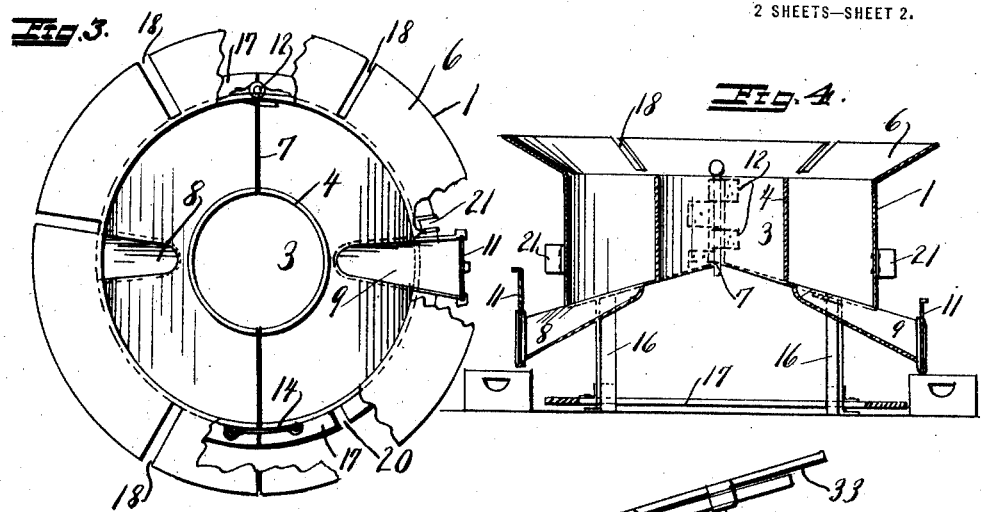
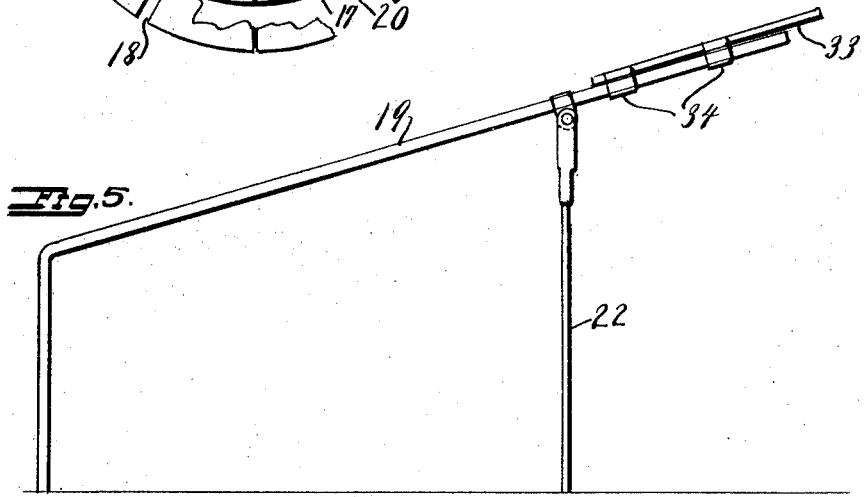
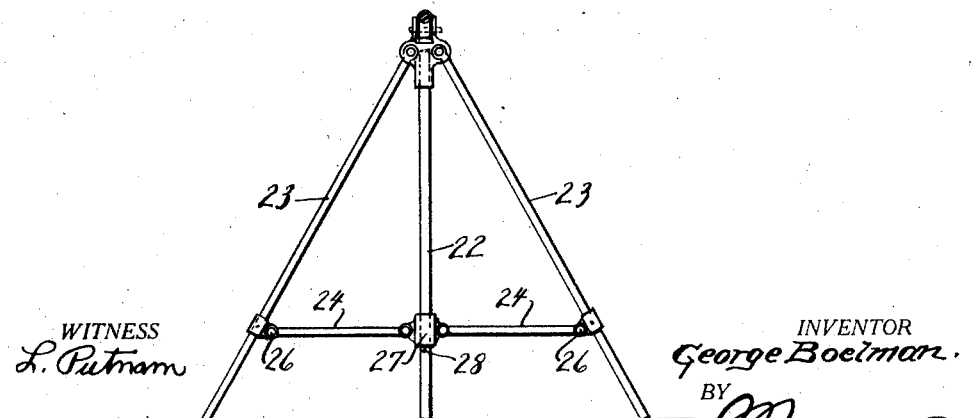
WITNESS
L. Putnam
INVENTOR
George Boelman.
BY
ATTORNEYS

UNITED STATES PATENT OFFICE.

GEORGE BOELMAN, OF GRIDLEY, CALIFORNIA.

FRUIT CATCHER.

1,415,863.  Specification of Letters Patent.  Patented May 16, 1922.

Application filed April 4, 1921. Serial No. 458,210.

*To all whom it may concern:*

Be it known that I, GEORGE BOELMAN, a citizen of the United States, and resident of Gridley, county of Butte, and State of California, have invented a new and useful Fruit Catcher, of which the following is a specification.

The present invention relates to means for catching falling fruit and its object is to provide a convenient device by which fruit falling from a tree may be received, conveyed to one or more small outlets and there delivered into fruit boxes. A further object of my invention is to provide a device for the above named purposes that is collapsible, easy to set up, that will stand firmly around the tree while in use and is easy to take apart again.

I attain these objects by the mechanism illustrated in the accompanying drawing, in which Figure 1 is a vertical central section through my fruit catcher, set up around a tree, Figure 2 a plan view of the same, the tree not being shown, Figure 3 a plan view of a basin forming a part of my fruit catcher, Figure 4 a vertical central section through said basin, Figure 5 a side view of an apron support and Figure 6 an elevation of a tripod.

The two principal parts of my fruit catcher are the basin 1 and the apron 2. The basing, circular in shape, is provided with a circular hole 3, which is sufficiently large to conveniently fit around the trunk of any fruit tree on which my catcher is expected to be used. To prevent the edge defined by the hole from cutting into the tree trunk I provide a cylindrical chimney 4 rising from said edge. The basin is cylinder-shaped, open on top, and has a flange 6 around its upper edge. The bottom consists of two flat sheets of metal, rising from opposite sides to a diametrical line 7. At the two opposite lowest points of the basin outlets 8 and 9 are provided, extending outside the basin and adapted to be closed by shutters 11. As will be seen from Figure 3, the entire basin consists of two symmetrical parts joined at the diametrical line 7. One of said parts is hinged to the other as shown at 12 and is adapted to be swung away from said part. While thus apart from each other, they can be easily slipped around the tree, closed again, and fastened together by means of the hook 14. The basin rests on a plurality of standards 16 connected to each other by the flat ring 17, which at the same time prevents the standards from burying themselves into the soil.

The flange 6 is provided with a plurality of radial slots 18, each adapted to receive the vertical part of a bent rod 19 (shown in Figure 5). This vertical part is further steadied by being guided through the channel 21 secured with its back to the outside of the cylindrical part of the basin and through a radial slot 20 in the flat ring 17, the two slots and the channel being vertically aligned.

The upper part of each rod 19 is bent outwardly so that all of them extend in radial direction, taking the tree for a center. Each of them is provided with a support 22 pivotally connected to its upper end so as to swing in the plane of the rod. One of said supports 22, which is to be used as the first one in setting up my device and which will be hereinafter referred to as the first support, is fortified by two other supports 23 pivoted to its upper end and swinging in a plane at right angles to the plane of the rod 19. Two braces 24 are provided to define the distance through which the supports 23 may swing. The braces are pivotally connected to each support 23 near its bottom, as shown at 26, and also to a sleeve 27, which slides on the support 22, a stop 28 limiting its downward motion.

The radially extending parts of the rods 19 are used as the ribs of the apron 2 and are permanently sewed into said apron, which, when in place, presents the shape of a large, rather flat, cone, as appears especially well from Figure 1. The apron has a joint 15 on the tripod-supported rib 19 and may be buttoned and unbuttoned there. For trees of extraordinary size I provide an extension apron 32 adapted to form a conical extension of the first apron. The latter is supported by ribs 33 which are permanently sewed into said apron in the proper places. These ribs are provided with sleeves 34 adapted to be slipped over the ends of the rods 19, which extend beyond the first apron. The extension apron has a joint like the main apron.

To use the fruit catcher, I swing the basin open on its hinges, slip it around the tree and close it again, securely locking it by means of the hook 14. I then put the first rod, which is supported by the tripod, in any one of the guideways defined by the slots 18 and 20 and the channel 21. The tripod gives a firm, independent support to the rod, so that there is no danger of this part of the device collapsing while I proceed with the other rods. After all the rods are in their respective places, I button the last lap of the apron to the first rod, thus completing the cone. If the tree is of extraordinary size, so that its branches extend beyond the lines of the apron, I take the second apron, slip the sleeves of its ribs over the rods 19 in proper succession and button it at its juncture.

I claim:

1. In a fruit catcher, a basin comprising two symmetrical parts forming a central opening, means for pivotally connecting said two parts at one end and for locking them at the other end, the bottom of said basin rising toward the connecting line and having outlets at its lowest points, and a plurality of vertical guideways arranged on the outside of said basin.

2. In a fruit catcher, a basin comprising two symmetrical parts forming a central opening, means for pivotally connecting said two parts at one end and for locking them at the other end, the bottom of said basin rising toward the connecting line and having outlets at its lowest points, a plurality of vertical guideways arranged on the outside of said basin, and a conical shaped apron adapted to be supported in said vertical guideways.

3. In a fruit catcher, a basin having a plurality of vertical guideways secured to its outside, a conical shaped apron having a buttoned joint and a plurality of ribs therein, vertical extensions of said ribs adapted to engage said guideways, each rib having a support pivotally connected thereto.

4. In a fruit catcher, a basin having a plurality of vertical guideways secured to its outside, a conical shaped apron having a buttoned joint and a plurality of ribs therein, vertical extensions of said ribs adapted to engage said guideways, one rib having a supporting tripod, the other ribs supporting rods pivotally connected thereto.

5. In a fruit catcher, a basin having a plurality of vertical guideways secured to its outside, a conical shaped apron having a buttoned joint and a plurality of ribs therein, vertical extensions of said ribs adapted to engage said guideways, each rib having a support pivotally connected thereto, a second apron having a corresponding joint and a corresponding plurality of ribs therein and means for detachably fastening said second ribs to said first ribs.

GEORGE BOELMAN.